United States Patent

Kriger

[15] 3,679,915

[45] July 25, 1972

[54] POLARITY HOLD LATCH WITH COMMON DATA INPUT-OUTPUT TERMINAL

[72] Inventor: Ronald J. Kriger, Endicott, N.Y.

[73] Assignee: International Business Machines Corporation, Armonk, N.Y.

[22] Filed: March 4, 1971

[21] Appl. No.: 121,098

[52] U.S. Cl. ..............................307/289, 307/213, 307/215, 307/218, 307/247, 328/206

[51] Int. Cl. ..........................................................H03k 3/12

[58] Field of Search..................307/247, 291, 292, 228, 218, 307/289, 213, 203, 215; 328/206, 93, 94

[56] References Cited

UNITED STATES PATENTS

| | | | |
|---|---|---|---|
| 3,569,842 | 3/1971 | Schroyer | 307/228 |
| 3,524,080 | 8/1970 | Savinese | 307/291 |

*Primary Examiner*—Rudolph V. Rolinec
*Assistant Examiner*—David M. Carter
*Attorney*—Hanifin and Jancin and John C. Black

[57] ABSTRACT

A logical circuit couples the in-phase output terminal of a polarity hold latch to the data input terminal of the latch to provide a common data input-output terminal. This is particularly useful in heavily integrated monolithically fabricated circuits where the amount of logical function that can be achieved is usually limited by the number of input-output pin connections that are available rather than the number of transistor circuits which are formed on a single semiconductor chip. However, the improved latch is also useful in reducing the number of input-output terminals in printed circuit cards for densely packaged electronic circuits since they also encounter pin limitations rather than electronic component limitations Gating means external to the semiconductor chip (or card) and in some instances gating of the logic circuit determine the time intervals when good input data and good output data exist on the common input-output terminals. In some instances, output data can be made available sooner than otherwise possible by careful use of the input data itself as good output data during the set time of the latch; i.e. the input signal to the latch is available sooner than its output and with the common input-output terminal its input signal can be used as an output signal before the latch output becomes available—an input to output signal delay of zero.

16 Claims, 7 Drawing Figures

INVENTOR
RONALD J. KRIGER

BY John C Black
ATTORNEY

POLARITY HOLD LATCH WITH COMMON DATA INPUT-OUTPUT TERMINAL

BACKGROUND OF THE INVENTION

Field of the Invention

D. C. (direct current) polarity hold latches are typically characterized by extremely fast cycle times and have found widespread usage in the central processing units of data processing systems. In its simplest form, the polarity hold latch can be comprised of a pair of input AND circuits, the outputs of which are ORed, the in-phase output of the latch being fed back as one input to one of the AND circuits. Data is applied to an input of the other AND circuit. A set-reset line is connected directly as an input of the one AND circuit and is coupled by way of an inverter to a second input of the other AND circuit. When the set-reset line has a logical zero voltage level applied to it, the voltage level on the inphase output "follows" (is the same as) the data input voltage; and, when a logical one voltage level is thereafter applied to the set-reset line, the one AND circuit together with the feedback connection causes the latch to be maintained in a logical state corresponding to that which exists at the instant that the logical one signal is applied to the set-reset line. One function of the inverter is to provide a delay which assures successful setting of the latch.

Polarity hold latches capable of making use of the present improvement can be constructed in other ways, for example, a pair of AND invert circuits being coupled to inputs of an OR invert circuit with an in-phase feedback to one of the AND invert circuits. A specific example of a more sophisticated high-speed data polarity latch is shown in U. S. Pat. No. 3,509,366. In said patent, a pair of plus OR circuits are referred to as comprising the polarity hold latch; however, it will be appreciated that a plus OR circuit is the equivalent of a minus AND circuit and that the latches are functionally equivalent.

SUMMARY OF THE INVENTION

In a preferred form of the present improvement, a polarity hold latch has its in-phase output terminal coupled to one input of a first AND circuit with the output of the AND circuit being connected to the data input line of the polarity hold latch. The AND circuit includes a second control input. A second AND circuit having a data input and a control input applies data input signals to the latch when the control input is at the logical one level. To latch this data up, a logical zero signal followed by a logical one signal is applied to the set-reset input to the latch to assure resetting of the latch so that it can "follow" the input data level and then be set. The control input to the first AND circuit is set to the logical zero level to produce a logical zero level at the output of the AND circuit thereby interrupting the feedback connection from the in-phase latch output to the data input line of the latch. A D. C. reset input is provided for the latch where required.

In the preferred embodiment, one or a plurality of polarity hold latches are fabricated on a single semiconductor chip or alternatively mounted on a single board to provide a substantial reduction in the number of input-output connections required by the chip or board as the case may be.

In one embodiment, the set-reset line also forms the control input to the first AND circuit. In another embodiment, the need for a control input to the first AND circuit is eliminated by providing a sufficient signal delay between the set-reset input and the inverted latch input to permit interruption of the feedback from the latch in-phase output and the data input line to assure resetting of the latch so that it can "follow" newly applied input data.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
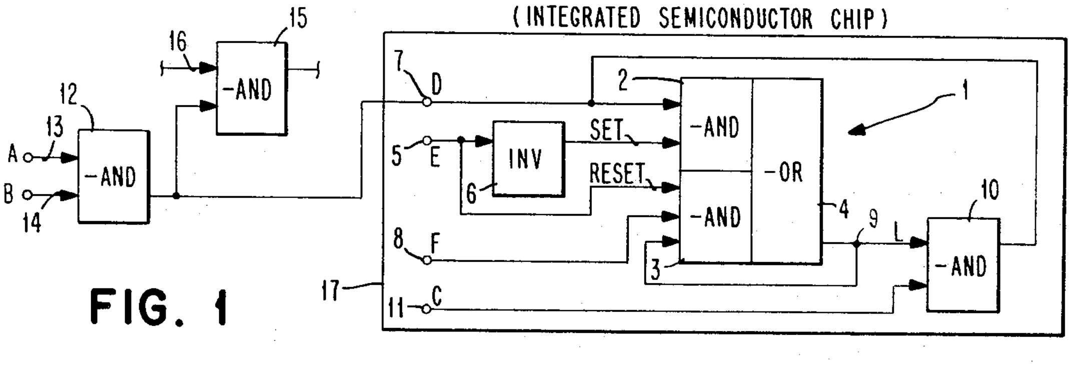
FIGS. 1, 3 and 5 illustrate different embodiments of a polarity hold latch incorporating the improvements of the present application.

FIG. 1 illustrates a polarity hold latch 1 comprising a pair of negative AND circuits (all relatively negative inputs produce a relatively negative output) 2 and 3, the outputs of which form inputs to a negative OR circuit (one relatively negative input produces a relatively negative output) 4. Set-reset signals are applied to an input terminal 5 which is connected directly to a RESET input of the AND circuit 3 and is connected to an input of AND circuit 2 by way of a signal inverter circuit 6. Data input signals are applied to terminal 7 which forms the second input of the AND circuit 2. D. C. reset signals (normally at a logical one level) are applied to an input terminal 8 which forms a second input to the AND circuit 3. A feedback connection from the in-phase output terminal 9 of the latch 1 forms a third input to the AND circuit 3.

The polarity latch as described above is of a type well known in the art with terminal 7 providing the data input signals and terminal 9 providing the data output signals. To set the latch in a state corresponding to the logical one or zero level of a signal applied to the terminal 7, a logical zero (relatively positive) signal is applied to terminal 5, which signal is inverted by the circuit 6 to produce a logical one signal (relatively negative) on the SET input of the negative AND circuit 2. This will cause the signal at the output terminal 9 to be at a logical one or zero level corresponding to (e.g., follows) the signal level at the data input terminal 7. Shortly thereafter, a logical one signal is applied to terminal 5 whereby the AND circuit 3 maintains the signal level at the output terminal 9 as follows. Except when the circuit is being specially reset (e.g., system reset in a data processing unit), a logical one signal is always maintained at the input terminal 8. Thus if, at the moment that the signal level at terminal 5 goes to the logical one level (relatively negative), logical one levels exist at terminals 8 and 9, the AND circuit 3 will produce a logical one output causing the OR circuit 4 to produce a logical one output whereby the latch is maintained in the logical one state. On the other hand, if terminal 9 is at the logical zero level, the AND circuit 3 is not satisifed, whereby the latch is maintained in the logical zero state.

When terminal 5 goes to the logical one state, invert circuit 6 delays the change of the SET line from logical one to logical zero so that AND circuit 3 is effective to hold the latch 1 in its logical state prior to AND circuit 2 being rendered ineffective by the logical zero state on the SET line.

In accordance with the teachings of the present improvement, a negative AND circuit 10 has a first input connected to the latch output terminal 9 and its output connected to the data input terminal 7. A control input terminal 11 forms a second input to the AND circuit 10.

Data is applied to the data input terminal 7 by means of an AND circuit 12 having a data input line 13 and a control signal input line 14. The output of the AND circuit is connected to the data input terminal 7. Latch output data is derived from the terminal 7 and applied to a negative AND circuit 15. A gate control line 16 forms a second input to the AND circuit 15 if a difference in time is required between the input signal and the output signal.

In order to achieve the advantages of the present improvement, it is assumed that the latch 1 and its associated AND circuit 10 are included on a single mounting structure 17 in an overall packaging arrangement. This can be in the form of discrete components being mounted on a circuit card 17 and having input/output pins 5, 7, 8 and 11, in the form of monolithically fabricated semiconductor components mounted on a ceramic module 17 as is common in the art or it can be in the more recently introduced large scale integration circuitry wherein a large number of latches 1 each with its corresponding AND circuit 10 being formed in a single semiconductor chip 17 and each having input/output pins such as 5, 7, 8 and 11.

Thus, with respect to the common mounting or packaging structure 17 as set forth by way of example above, the terminal 7 for each latch 1 comprises both a data input terminal as well as a data output terminal whether it be card, ceramic module or semiconductor chip. The AND circuits 12 and 15 and their control inputs 14 and 16 are suitably controlled in time relative to each other so as to render the common input/output terminal 7 effective for accepting good input data at one time interval and effective for presenting good output data at another time. It will be possible in many instances to permit some overlap between good input and good output data times, permitting a zero delay through the logic.

In a packaging arrangement, wherein a large plurality of latches and their corresponding AND circuits 10 are included on a single card module or semiconductor chip, the savings in input-output pins is significant because the data input/output lines must be provided for each and every latch whereas a common terminal such as 5 or 8 or 11 may usually be provided for all latches. Thus, in a packaging arrangement having for example eight latches on a single mounting structure, the number of terminals is reduced from 19 to 11.

Attention is directed at this time to the conventional manner of gating data to latches and gating output data from latches to other utilization circuits. Typically, in data processing equipment, it is common to find the input data gated just as it is gated by the AND circuit 12, and it is common to find the output data gated by an AND circuit such as 15. Thus, gating circuits such as 12 and 15 would normally be provided for each latch, and the only addition which is required to obtain the improvement is the inclusion of the AND circuit 10.

The operation of the latch 1 with its associated AND circuit 10 is substantially similar to the operation of the latch 1 described above. In addition, the logical value existing at the latch output terminal 9 is applied to the common input/output terminal 7 when a logical 1 (relatively negative) value is applied to the terminal 11 which forms the second input to the AND circuit 10. When the latch 1 is being reset, i.e., a logical zero signal is applied to terminal 5, a logical zero signal must also be applied to the terminal 11 to isolate the latch output terminal 9 from the common input/output terminal 7. If this isolation of the terminal 9 from the terminal 7 were not provided by the terminal 11 signal, it would not be possible to reset the latch to a state corresponding to a logical zero input from AND circuit 12 while a logical one signal from a previous set/reset cycle is still applied to the terminal 7 from the terminal 9 via the AND circuit 10. More specifically, when two negative AND circuits such as 10 and 12 have their outputs "DOT-ORed" together, either one of the circuits 10 or 12 producing a logical one output signal will override a logical zero output signal from the other AND circuit. Thus, control of the second input to the AND circuit 10 (or some other equivalent isolating circuit as will be seen later with respect to FIG. 5) is required.

Figure 2:
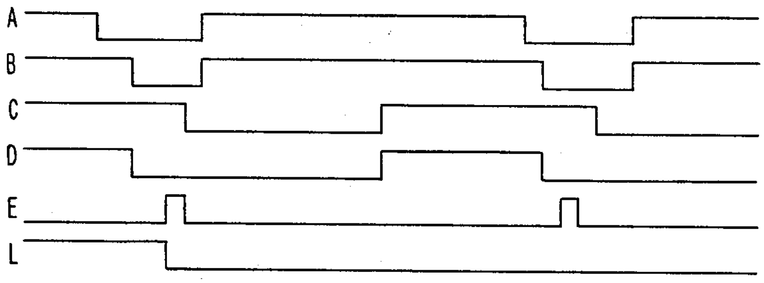
FIGS. 2, 4 and 6 are timing diagrams each illustrating the operation of the embodiments of FIGS. 1, 3 and 5 respectively in response to selected data and control signals.

FIG. 2 is a timing diagram given by way of example to illustrate one manner of controlling the operation of the circuit of FIG. 1. As indicated above, logical zero signals are the upper or relatively positive levels in the timing chart, and logical one signals are the lower or relatively negative levels illustrated in the timing chart. In the timing chart, the signals applied respectively to lines 13 and 14 and terminals 11, 7, 5 respectively are A, B, C, D and E. The signal L (at terminal 9) indicates in its lower level the state of the latch when it has been set and maintained following the application of a logical one signal to its input 7. As seen in the timing chart, the signal level D at the terminal 7 goes negative at the leading edge of the relatively negative logical one signal B appearing at the control line 14 coincident with the data signal A at line 13 being in its logical one state. On the leading edge of the positive going set-reset signal E, the latch 1 assumes its logical one state (signal L), it being realized that there is a small delay before it reaches its logical one state because of the delay introduced by the invert circuit 6 to the logical one signal on the SET input to the AND circuit 2. The latch is maintained in this logical one state until the next leading edge of the positive going set-reset signal E concurrent with a logical zero data input from circuit 12. The timing chart illustrates the control signal C going positive to render the AND circuit ineffective isolating the latch output signal L at terminal 9 from the common input/output terminal 7 whereby a logical zero signal D appears at terminal 7. The timing chart illustrates this to indicate what can be done in a situation where output signals can be derived from 7 only for a short time period following setting of the latch, that is between the negative going transient of the set-reset signal E and the positive going transient of the control signal C.

Figure 3:
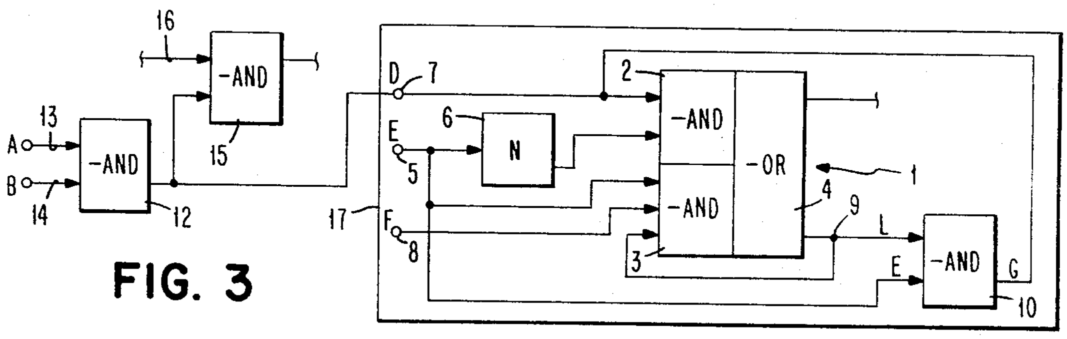

FIG. 3 illustrates a polarity hold latch modified in accordance with the teachings of the present application which is substantially the same as the improved latch illustrated in FIG. 1 except that control of the associated AND circuit 10 is achieved with the same signal which is used to set and reset the latch. Since the elements of the latches in FIGS. 1 and 3 are substantially the same, the same reference numerals will be used for corresponding components.

Thus, in FIG. 3, the latch 1 comprises negative AND circuits 2 and 3 and a negative OR circuit 4. The negative AND circuit 10 couples the output terminal 9 of the latch to a common input-output terminal 7. A set-reset input terminal 5 is connected directly to one input of the AND circuit 3 and to a control input of the AND circuit 10. The terminal 5 is also coupled by way of an inverter 6 to a second input of the AND circuit 2. The D. C. reset input terminal 8 forms a second input to the negative AND circuit 3. A negative AND circuit 12 having a data input line 13 and a control input line 14 provides input data to the latch 1 by way of the terminal 7. Output data from the latch 1 is gated to one or more utilization devices (not shown) by means of an AND circuit 15 having one input connected to the terminal 7 and a second input connected to a control line 16 if a difference in time is required between the input signal and the output signal.

The embodiment of FIG. 3 operates substantially in the same manner as that of FIG. 1 with the constraint that the coupling of the latch output terminal 9 to the common input-output terminal 7 is determined by the specific set-reset signals applied to the terminal 5. In many data processing environments, this constraint does not prevent the usage of the embodiment of FIG. 3. The advantage which is gained by the embodiment of FIG. 3 is the elimination of a control input terminal such as terminal 11 of FIG. 1, thus further minimizing the number of input-output terminals required.

Figure 4:
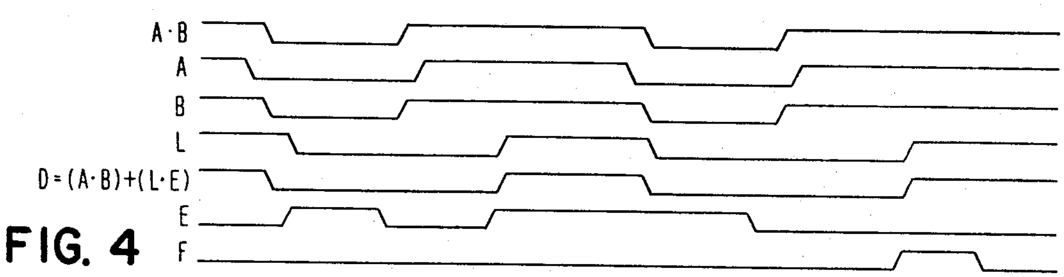

FIG. 4 is a timing diagram which illustrates one form of operating the circuit of FIG. 3 using the same signal reference characters as illustrated in FIG. 1 where the signals correspond to each other. Thus, the sample input data and control signals A and B are illustrated producing an output signal $A \cdot B$ output from the AND circuit 12 for application to the latch 1. The set-reset signal E is illustrated showing its positive going transient causing the output signal L at terminal 9 of the latch going to a logical one state in response to the logical one signals $A \cdot B$ and $\bar{E}$ satisfying the input conditions of the AND circuit 2. The negative going transient of the set-reset signal E renders the AND circuit 10 effective for causing the logical one level of signal L to maintain the terminal 7 at the logical one state when the input signal $A \cdot B$ shortly thereafter goes from the logical one to the logical zero state. The signal L remains in its logical one state until the set-reset signal E goes positive at a time when the signal $A \cdot B$ is positive.

Figure 5:
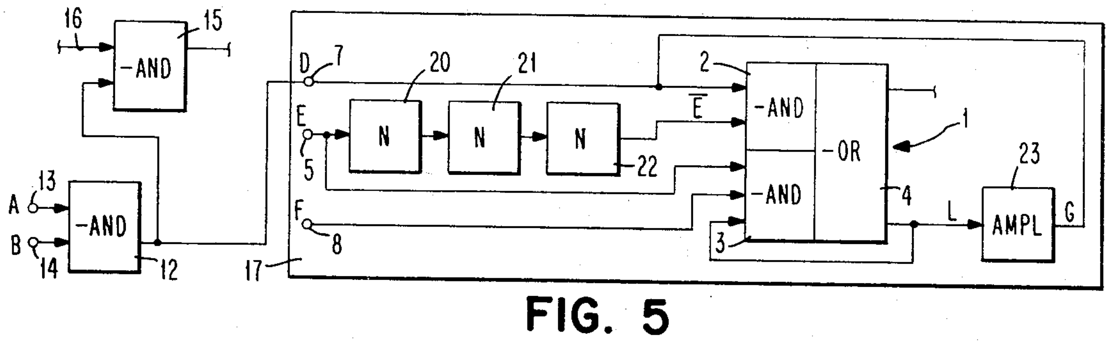
Figure 6:
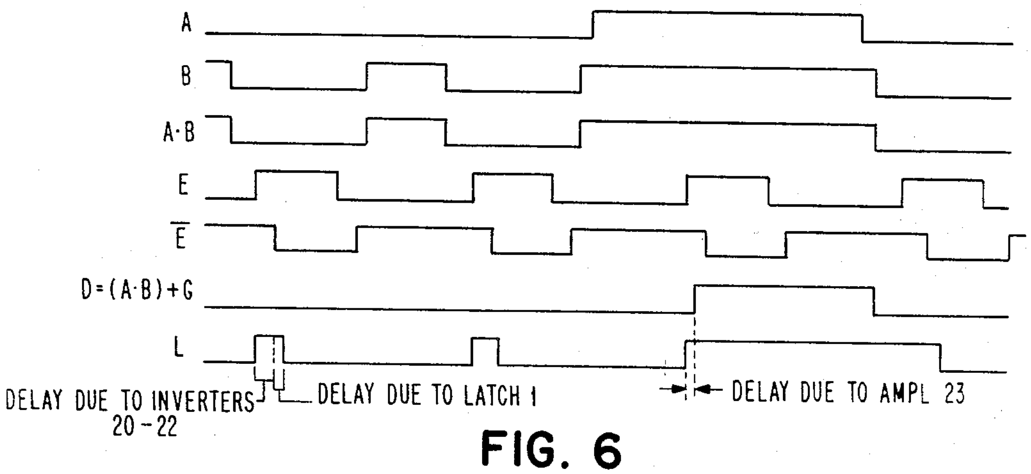

FIG. 5 illustrates another embodiment of the improved latch which is substantially the same as those illustrated in FIGS. 1 and 3 except that the need for a two-input AND circuit such as 10 is no longer required. Components in FIG. 5 corresponding to those in FIGS. 1 and 3 will be assigned the same reference numerals, and corresponding signals will be assigned the same reference characters. Thus, in FIG. 5, signals A and B are applied to lines 13 and 14 which form inputs to a negative AND circuit 12 for applying input data signals to the latch 1 by way of a common input-output terminal 7. A negative AND circuit 15 for coupling output signals from the latch to utilization devices (not shown) includes a control input line 16 and a second input connected to the terminal 7 if a difference in time is required between the input signal and the output signal. The latch 1 comprises negative AND circuits 2 and 3 and a negative OR circuit 4. The set input terminal 5 is connected directly to one input of the AND circuit 3 and is connected to one input of the AND circuit 2 by way of three invert circuits 20, 21 and 22. The latch output terminal 9 is coupled to the terminal 7 by way of a non-inverting signal amplifier 23. Thus, a signal G corresponding to the signal level L which exists at the latch output terminal 9 is applied to the terminal 7 with a slight delay in signal level changes caused by the inherent delay of the amplifier 23.

One of the functions of the control input signal C of FIG. 1 will now become apparent as a result of the variation illustrated in FIG. 5. Assurance must be provided in each of the latches illustrated that the latch may be set to that state corresponding to a logical zero input condition when the latch output signal level L is at the logical one state and is coupled through the non-inverting AND circuit 10 of FIGS. 1 and 3 or the non-inverting amplifier 23 of FIG. 5. More specifically, with respect to FIG. 1, assume a condition where the output of the AND circuit 12 is at the logical zero state and the output of the AND circuit 10 is at the logical one state and that at this instant the set-reset signal E goes positive. Unless the logical one output signal from the AND circuit 10 is removed from the terminal 7, the AND circuit 2 will maintain the latch in a state corresponding to a logical one input while the signal E is positive, and then the AND circuit 3 will maintain it in this state when the signal E goes negative. Unless the signal C at terminal 11 goes positive while signal E is positive to render the AND circuit 10 ineffective permitting the signal D at terminal 7 to go positive, the latch 1 cannot be reset to the logical zero state. Thus, one function of the signal C at terminal 11 is to assure reset under these conditions, and its other function is to determine when the signal on terminal 7 may be used as valid output signal for application to a utilization device by way of AND circuit 15.

In FIG. 3, this reset function is provided by the set-reset signal E at terminal 5 which renders the AND circuit 10 ineffective when signal E goes positive during reset.

It will be appreciated therefore that some means must be provided in FIG. 5 for assuring reset of the latch 1 under the conditions stated above. This function is provided in the preferred embodiment by invert circuits 20, 21, and 22, each of which has a delay time from input to output for signal changes which is equivalent to the input-to-output delay of amplifier 23. It is also assumed in FIG. 5 that the AND circuits 2 and 3 and the OR circuit 4 have corresponding input-to-output delays since the various logical components are constructed using the same technology. In FIG. 5, assume that, when the set-reset signal E goes positive, the signal L is at the logical one state, the output signal G of the amplifier 23 is at the logical one state and the output of the AND circuit 12 is at the logical zero state. Since the AND circuit 12 and the amplifier 23 are "DOT-ORed" together, a logical one output G overrides the logical zero output of AND circuit 12, thus applying a logical one signal to the AND circuit 2. During the three delay intervals provided by the inverters 20, 21 and 22, the level of the signal $\overline{E}$ applied to the other input of the AND circuit 22 is positive. At the end of the first delay interval, the output of the AND circuit 2 and the OR circuit go positive (the OR circuit 2 is a DOT-OR of the AND circuits 2, 3 and has no delay); and at the end of the second delay interval, the output signal G of the amplifier 23 goes positive.

Thus, the input signal D to the AND circuit 2 goes positive to break the latch-up loop before the signal $\overline{E}$ goes negative.

FIG. 5 is a timing diagram having an arbitrarily selected set of signal changes to illustrate one manner of operating the embodiment of FIG. 5. Arbitrarily selected changes in the signals A and B of FIG. 5 produce a signal A · B output from the AND circuit 12. The set-reset signal E and its substantially delayed complementary signal $\overline{E}$ are illustrated with typical delay intervals shown. Signal D is illustrated as an ORing of the signal A · B with the output signal G from the amplifier 23 and the output signal L illustrating the state of the latch 1 is shown changing in accordance with the changes in the input signals A, B and E. The delays caused by the components of FIG. 5 have been exaggerated so that they can be visually observed in FIG. 5. It will be appreciated that the particular delay interval for each component or logical circuit depends upon the type of circuits (technology) used; however, in the preferred embodiment each of the components has the same nominal input-to-output signal change delay interval because of the common technology.

As indicated with respect to FIG. 1, the latches of FIGS. 3 and 5 may be carried by a single board or module or fabricated in a single semiconductor chip depending upon the technology being used. Also, more than one latch can be included on the same board, module or semiconductor chip.

Figure 7:
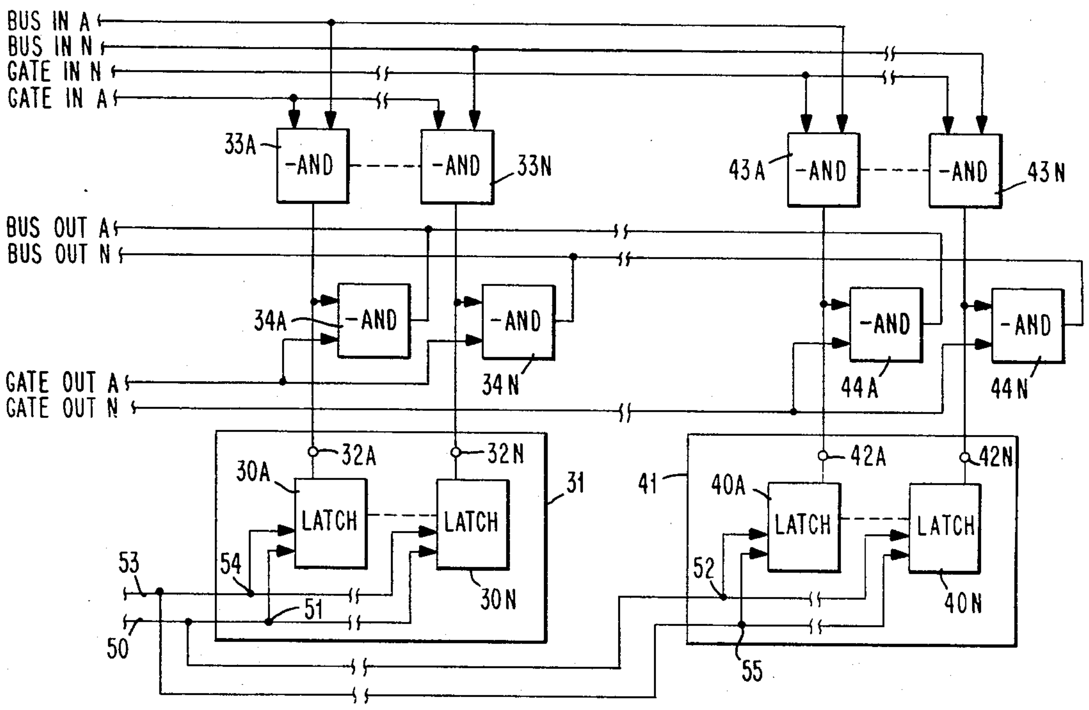
FIG. 7 diagrammatically illustrates input-output gating to a plurality of latches carried on a single packaging member such as semiconductor chip or a board.

FIG. 7 illustrates one way in which a plurality of latches can be included on a single card, module or chip depending upon the circuit and packaging technologies used. A plurality of latches 30A–30N are mounted on a first structure 31, each latch having a respective data input terminal 32A–32N. An input bus comprising lines BUS IN A - BUS IN N are coupled respectively to the terminals 32A–32N by way of AND circuits 33A–33N. A common input gating line GATE IN A renders all AND circuits 33A–33N simultaneously effective for coupling the lines BUS IN A to BUS IN N to their respective input terminals 32A–32N.

A data output bus comprising lines BUS OUT A - BUS OUT N are coupled to the terminals 32A to 32N respectively by means of AND circuits 34A–34N respectively. A common output gating line GATE OUT A renders all AND circuits 34A–34N simultaneously effective to couple the terminals 32A–32N to lines BUS OUT A - BUS OUT N.

In the embodiment of FIG. 7, it is assumed by way of example that the structure 31 includes a plurality of latches 30A–30N which comprise one register of a data processing system. A second register of the system is included on a similar structure 41 and includes latches 40A–40N with common input-output terminals 42A–42N coupled to the data input and output buses by AND circuits 43A–43N and 44A–44N respectively. Lines GATE IN N and GATE OUT N respectively render the AND circuits 43A–43N and 44A–44N effective to couple the common input-output terminals 42A–42N to the input and output data buses.

In the preferred embodiment, a common set-reset line 50 is coupled to all registers, each register such as 31 and 41 having its respective set-reset input terminal 51 and 52 connected to all latches in the respective register. Similarly, a common D. C. reset line 53 is provided for all registers, each register such as 31 and 41 having a single input D. C. reset terminal such as 54 and 55 coupled to all latches of its respective register.

It will be appreciated that the common input-output terminals such as 32A–32N and 42A–42N correspond to the common input-output terminal 7 of FIGS. 1, 3 and 5 depending upon which embodiment is utilized. The input terminals 51 and 52 correspond to the terminal 5 of each embodiment, and terminals 54 and 55 correspond to the terminal 8 of each embodiment. AND circuits 33A–33N and 43A–43N correspond to the AND circuit 12 of each embodiment. The AND circuits 34A–34N and 44A–44N correspond to the AND circuit 15 of each embodiment.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a polarity hold latch having a data input line receiving signals at one or the other of two levels, an output line, a set-reset line, and means effective when a first signal level is applied to the set-reset line for producing on he output line the same signal level as exists on the data input line and effective when a second signal level is applied to the set-reset line to maintain said the signal level on the output line irrespective of signal level changes on the data input line, a logical circuit providing the latch with a common data input-output line comprising one input connected directly to said output line, an output connected directly to said data input line, a second input connected directly to said set-reset line, and logical means effective when the second signal level is applied to the set-reset line for applying to said logical circuit output the signal level that exists on the latch output line to selectively provide latch output signals on the data input line.

2. The combination set forth in claim 1 carried by a single mounting structure having data and control signal pins for connecting the latch to other circuits, a common data input-output pin being provided for the latch.

3. The combination set forth in claim 2 wherein the polarity hold latch means includes a direct connection between the set-reset line and a reset input, and a signal delaying and inverting means between the set-reset line and a set input and effective to assure error free operation of the latch when said first and second signal levels are applied to the set-reset line.

4. The combination set forth in claim 2 together with means external to the mounting structure for selectively gating data input and output signals to and from the common input-output pin.

5. The combination set forth in claim 1 monolithically fabricated upon a single semiconductor chip and having a common data input-output pin connected to the data input line for coupling input and output data signals to and from the latch.

6. In combination with a polarity hold latch having a data input line receiving signals at one or the other of two levels, an output line, a set-reset line, and means effective when a first signal level is applied to the set-reset line for producing on the output line the same signal level as exists on the data input line and effective when a second signal level is applied to the set-reset line to maintain said same signal level on the output line irrespective of signal level changes on the data input line, a logical circuit comprising one input connected to said output line, an output connected to said data input line, a control input line, and logical means effective when a selected one of two signal levels is applied to the control input line for applying to said logical circuit output the signal level that exists on the latch output line to selectively provide latch output signals on the data input line.

7. The combination set forth in claim 6 carried by a single mounting structure having data and control signal pins for connecting the latch to other circuits, a common data input-output pin being provided for the latch.

8. The combination set forth in claim 7 wherein the polarity hold latch means includes a direct connection between the set-reset line and a reset input, and a signal delaying and inverting means between tHe set-reset line and a set input and effective to assure error free operation of the latch when the signal level applied to the set-reset line changes from said first to said second level.

9. The combination set forth in claim 7 together with means external to the mounting structure for selectively gating data input and output signals to and from the common input-output pin.

10. The combination set forth in claim 6 monolithically fabricated upon a single semiconductor chip and having a common data input-output pin connected to the data input line for coupling input and output data signals to and from the latch.

11. An electronic circuit carried by a single packaging structure having a minimum number of data input and output pins for electrical connection with circuits on other structures comprising, a plurality of polarity hold latches mounted on the structure, each latch having a data input line receiving signals at one or the other of two levels, an output line, a set-reset line, and means effective when a first signal level is applied to the set-reset line for producing on the output line the same signal level as exists on the data input line and effective when a second signal level is applied to the set-reset line to maintain said same signal level on the output line irrespective of signal level changes on the data input line, and a plurality of logical circuits, one for each latch, and each comprising one input connected to its respective latch output line, an output connected to its respective latch data input line, a control input line, and logical means effective when a selected one of two signal levels is applied to its control input line for applying to its respective logical circuit output the signal level that exists on its respective latch output line to selectively provide latch output signals on its latch data input line thereby providing a common data input-output connection for each latch.

12. The combination set forth in claim 11 wherein each polarity hold latch means includes a direct connection between the set-reset line and a respective reset input, a direct connection between the set-reset line and the control input line associated with its latch, and a signal delaying and inverting means between the set-reset line and a set input and effective to assure error free operation of the latch when said first and second signal levels are applied to the set-reset line.

13. The combination set forth in claim 11 together with a common input-output pin connected to each latch data input line, and means external to the packaging structure for selectively gating data input and output signals to and from each common input-output pin.

14. The combination set forth in claim 11 wherein the packaging structure is a single semiconductor chip, wherein the electronic circuit is monolithically fabricated upon said chip, and wherein a respective common data input-output pin is connected to each data input line for coupling input and output data signals to and from each latch.

15. A polarity hold latch monolithically fabricated on a single semiconductor chip and having a common data input-output pin, said latch comprising a data input line connected to said pin for receiving signals at one or the other of two levels, a latch output line, a set-reset line, first logical circuit means effective when a first signal level is applied to the set-reset line for producing on the latch output line the same signal level as exists on the data input line and effective when a second signal level is applied to the set-reset line to maintain said same signal level on the output line irrespective of signal level changes on the data input line, second logical circuit means having an input connected to the output line and an output connected to said pin and effective to produce at its output the same signal level as that on the latch output line, said first logical circuit means including a signal delaying and inverting means between the set-reset line and a set input and effective to assure error free operation of the latch when said first and second signal levels are applied to the set-reset line.

16. The combination set forth in claim 15 together with means external to the chip for selectively gating data input and output signals to and from the common input-output pin.

* * * * *